(12) United States Patent
Fujita

(10) Patent No.: US 8,241,809 B2
(45) Date of Patent: Aug. 14, 2012

(54) FUEL CELL SYSTEM

(75) Inventor: Nobuo Fujita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 587 days.

(21) Appl. No.: 12/443,026

(22) PCT Filed: Oct. 18, 2007

(86) PCT No.: PCT/JP2007/070757
§ 371 (c)(1),
(2), (4) Date: Mar. 26, 2009

(87) PCT Pub. No.: WO2008/053768
PCT Pub. Date: May 8, 2008

(65) Prior Publication Data
US 2009/0325015 A1  Dec. 31, 2009

(30) Foreign Application Priority Data

Oct. 30, 2006 (JP) .................................. 2006-293513

(51) Int. Cl.
*H01M 8/04* (2006.01)

(52) U.S. Cl. .......................... 429/444; 429/413; 429/415

(58) Field of Classification Search ........................ None
See application file for complete search history.

(56) References Cited

U.S. PATENT DOCUMENTS

2003/0232226 A1* 12/2003 Morishima et al. .............. 429/24
2006/0008689 A1*  1/2006 Yonekura et al. ................ 429/25

FOREIGN PATENT DOCUMENTS

| DE | 103 25 754 A1 | 1/2004 |
| JP | 2004-127817 A | 4/2004 |
| JP | 2004-185974 A | 7/2004 |
| JP | 2005-332676 A | 12/2005 |
| JP | 2006-134695 A | 5/2006 |
| JP | 2007-194189 A | 8/2007 |
| WO | 2005/053070 A1 | 6/2005 |

OTHER PUBLICATIONS

Office Action issued Sep. 8, 2011 in German Patent Application No. 11 2007 002 560.3 and English translation thereof.

* cited by examiner

*Primary Examiner* — Patrick Joseph Ryan
*Assistant Examiner* — Wyatt McConnell
(74) *Attorney, Agent, or Firm* — Kenyon & Kenyon LLP

(57) ABSTRACT

A fuel cell system comprises a fuel gas supply conduit which supplies fuel gas to a fuel cell, a circulation conduit which returns discharged fuel gas discharged from the fuel cell to the fuel gas supply conduit, and a control device. When the control device determines that freezing may occur, the control device releases the discharged fuel gas from a water discharge valve of a gas-liquid separator provided in the circulation conduit to the outside, and reduces the flow volume of the discharged fuel gas returned to the fuel gas supply conduit in order to reduce moisture contained in the gas. Consequently, freezing can be prevented using a simple structure.

5 Claims, 3 Drawing Sheets

FUEL CELL SYSTEM

This is a 371 national phase application of PCT/JP2007/070757 filed 18 Oct. 2007, claiming priority to Japanese Patent Application No. JP 2006-293513 filed 30 Oct. 2006, the contents of which are incorporated herein by reference.

TECHNICAL FIELD

The present invention relates to a fuel cell system which includes a fuel cell and a gas supply unit that supplies fuel gas and oxidation gas to the fuel cell and, more particularly, relates to freezing prevention in the system.

BACKGROUND ART

A fuel cell is a device in which electricity is generated by cause a fuel gas and an oxidation gas to undergo an electrochemical reaction. There has been known a fuel cell system which includes a gas supply unit which supplies fuel gas and oxidation gas to the fuel cell. Such a fuel cell system typically comprises, as a fuel gas supply unit, a supply conduit which supplies the fuel gas from a fuel gas source to the fuel cell. Then, the fuel cell system has a circulation conduit which returns discharged fuel gas discharged from the fuel cell to the supply conduit. The discharged fuel gas includes water generated by electrochemical reaction and fuel gas which is discharged from the fuel cell without having undergone electrochemical reaction. Such fuel gas contained in the discharged fuel gas is returned to the fuel cell via the circulation conduit and the supply conduit, and, accordingly, electric generation efficiency of the fuel cell system is enhanced.

In such a fuel cell system, the fuel gas in the fuel gas source is influenced by the outside environment, and the temperature of the fuel gas tends to become approximately the same as the outside temperature. Then, the fuel gas in the fuel gas source is depressurized from a high pressure state and delivered to the supply conduit, such that the temperature of the fuel gas which flows in the supply conduit becomes lower than the outside temperature. When the outside temperature is near 0° C., the temperature of the fuel gas flowing through the supply conduit, which is lower than the outside temperature, is below the freezing point of water. As moisture present in the discharged fuel gas flowing from the circulation conduit to the supply conduit is cooled by the fuel gas which below the freezing point, there is a problem that the moisture can be frozen in the supply conduit.

Japanese Patent Application Laid-Open No. 2005-332676 discloses a fuel cell system which prevents the freezing of water in a supply conduit by supplying a portion of the heat generated by electrochemical reaction to the supply conduit. The circulation conduit of the fuel cell system is provided with a gas-liquid separator by which moisture presented in the discharged fuel gas is separated therefrom and released to the environment. When the gas-liquid separator discharges the moisture contained in the discharged fuel gas to the outside, heat energy generated by the electrochemical reaction is also expelled at the same time. In a case wherein moisture is likely to be frozen in the supply conduit, the fuel cell system disclosed in Japanese Patent Application Laid-Open No. 2005-332676 controls the gas-liquid separator so as to not release the moisture contained in the discharged fuel gas and to increase the amount of the heat generated by the electrochemical reaction, the excess heat being delivered to the supply conduit. As more heat generated by the electrochemical reaction is supplied into the supply conduit, it becomes possible to warm the fuel gas delivered from the fuel gas source sufficiently to prevent freezing in the supply conduit.

However, when the amount of heat generated by the electrochemical reaction is small, the fuel cell system disclosed in Japanese Patent Application Laid-Open No. 2005-332676 cannot sufficiently warm the fuel gas flowing from the fuel gas source. There therefore remains a possibility that the moisture present in the discharged fuel gas will be cooled by the fuel gas to the extent that it will be frozen in the supply conduit.

DISCLOSURE OF THE INVENTION

According to the present invention, there is provided a fuel cell system which includes a supply conduit which supplies fuel gas from a fuel gas source to a fuel cell, a circulation conduit which returns discharged fuel gas discharged from the fuel cell to the supply conduit and circulates the discharged fuel gas to the fuel cell, a temperature detection unit which detects the temperature of the fuel gas which flows in the supply conduit, and a flow volume control unit which releases at least a portion of the discharged fuel gas to outside of the fuel cell system and controls the flow volume of the discharged fuel gas to be returned to the supply conduit, based on the detection temperature detected by the temperature detection unit. When the detection temperature less than or equal to a predetermined value, the flow volume control unit controls the flow volume of the discharged fuel gas to a value less than when the detection temperature exceeds the predetermined value.

BEST MODE FOR CARRYING OUT THE INVENTION

Figure 1:
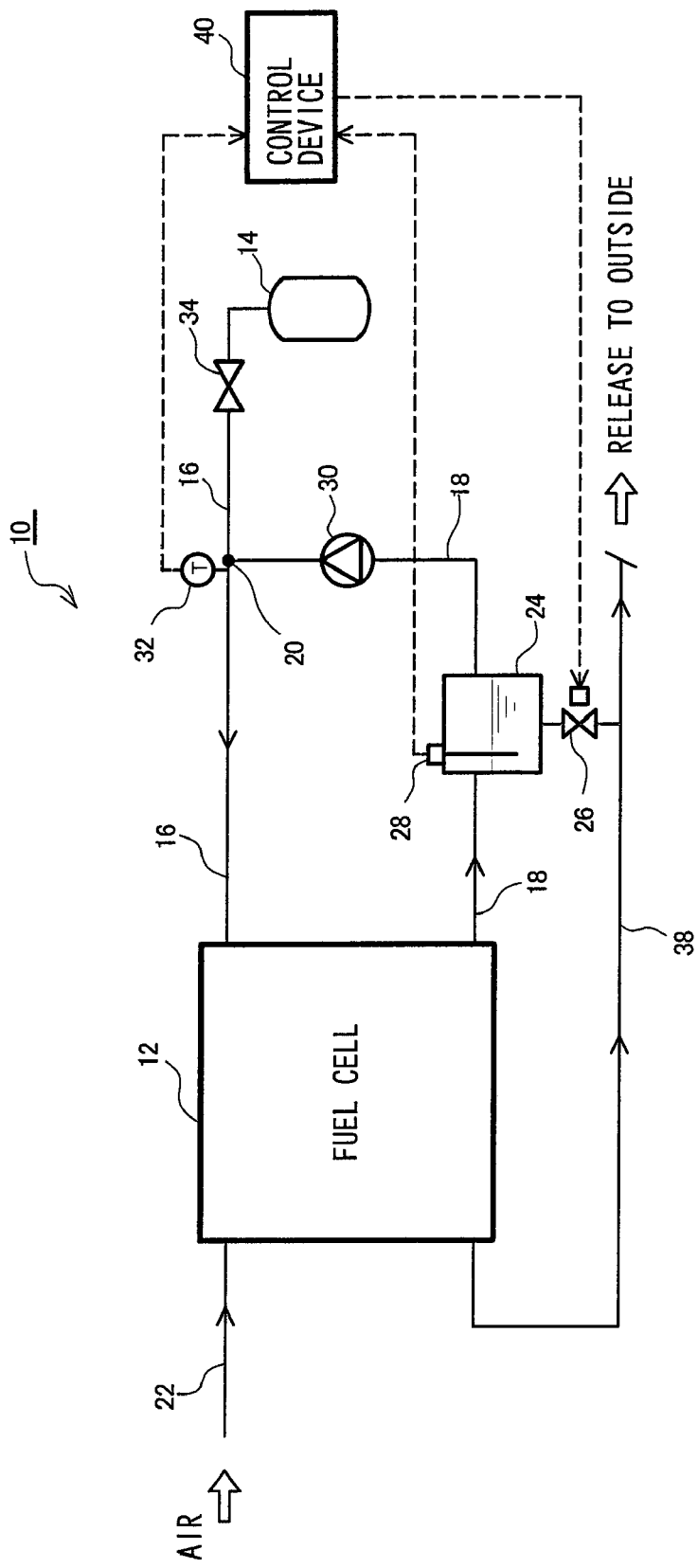
FIG. 1 is a diagram showing a schematic configuration showing a fuel cell system according to an embodiment of the present invention.

Hereinafter, an embodiment of a fuel cell system according to the present invention will be described with reference to the drawings. FIG. 1 is a diagram showing a schematic configuration of a fuel cell system 10 according to the present embodiment. The fuel cell system 10 comprises a fuel cell 12 in which electric generation is produced by causing a fuel gas and an oxidation gas to undergo an electrochemical reaction.

A fuel gas supply conduit 16 which supplies fuel gas to a fuel electrode (not shown in the drawing) of the fuel cell 12 and an oxidation gas supply conduit 22 which supplies oxidation gas to an air electrode (not shown in the drawing) of the fuel cell 12 are connected to the fuel cell 12.

Furthermore, a circulation conduit 18 which returns discharged fuel gas discharged from the fuel electrode to the fuel gas supply conduit 16 and circulates the discharged fuel gas to the fuel cell 12, and a release conduit 38 which releases the excess oxidation gas discharged from the air electrode to the outside are connected to the fuel cell 12.

Here, the fuel cell 12 is a solid polymer type fuel cell having an electrolyte membrane that is a proton-conducting membrane formed by a polymeric material, for example, fluorine resin or the like. In a unit cell (not shown in the drawing) of the fuel cell, a membrane electrode assembly (MEA), which is configured by sandwiching the electrolyte membrane between the fuel electrode and the air electrode, is configured by further sandwiching between two sheets of separators. The fuel cell 12 has a stack (not shown in the drawing) configured by laminating a plurality of unit cells.

The electrochemical reaction in the fuel cell 12 will be described. The fuel gas (hydrogen gas) is supplied to the fuel electrode of each unit cell, and the oxidation gas (air) is supplied to the air electrode. In the fuel electrode, the fuel gas is dissociated to a hydrogen ion and an electron, and the dissociated hydrogen ion is passed through the electrolyte membrane and directed to the air electrode, while the dissociated electron is passed through an external circuit and then directed to the air electrode. In the air electrode, the hydrogen ions which have passed through the electrolyte membrane and the electrons which have passed through the external circuit react with oxygen in the air, generating water. By this series of electrochemical reactions, the respective unit cells can generate electric power which can be output from the fuel cell. In addition, because the respective unit cells are directly electrically connected, the voltage of the electric power output from the fuel cell 12 is the combined voltage of the respective unit cells.

The fuel cell system 10 comprises a fuel gas tank 14 which stores fuel gas in a high pressure state as a power supply source for supplying the fuel gas to the fuel cell 12. The fuel gas tank 14 is connected to the fuel gas supply conduit 16, and the fuel gas is depressurized from the high pressure state and delivered to the fuel gas supply conduit 16. The delivered fuel gas is supplied to the fuel cell 12 via the fuel gas supply conduit 16.

The fuel gas supply conduit 16 is provided with a fuel gas flow volume control device 34 in the vicinity of the fuel gas tank 14. The fuel gas flow volume control device 34 has a flow volume adjusting valve (not shown in the drawing) which controls the flow volume and pressure of the fuel gas. The flow volume adjusting valve controls the amount of fuel gas supplied from the fuel gas tank 14 to the fuel cell 12 in consideration of the electric power required from the fuel cell 12.

In addition, the circulation conduit 18 is connected to the fuel gas supply conduit 16 downstream of the fuel gas flow volume control device 34, and the connected portion is provided with a temperature sensor 32 which detects temperature of the fuel gas that flows in the fuel gas supply conduit 16. The temperature sensor 32 outputs a signal which indicates the detected temperature to a control device 40 described below. Hereinafter, the section of the conduits where the circulation conduit 18 is connected to the fuel gas supply conduit 16, and therefore where the fuel gas flowing from the fuel gas tank 14 and the discharge fuel gas flowing from the fuel cell 12 are mixed is herein after referred to as the interflow section 20.

A gas-liquid separator 24 and a circulation device 30 are provided, in that sequence, in the circulation conduit 18 between the fuel cell 12 and the interflow section 20. The discharged fuel gas discharged from the fuel cell 12 contains unreacted fuel gas (hydrogen gas), water generated by the electrochemical reaction, and water vapor in which the water is vaporized by reaction heat. The gas-liquid separator 24 is a device which separates water contained in the discharged fuel gas. A water discharge valve 26 which drains the separated water is connected to the gas-liquid separator 24, and the release conduit 38 is connected to the water discharge valve 26. The water discharge valve 26 is a valve which performs, for example, two-positional operation, that is, ON/OFF operation. Because the water in the discharged fuel gas is separated by the gas-liquid separator 24, water vapor is contained in the discharged fuel gas passed through the gas-liquid separator 24.

A water level sensor 28 which detects the water-level of the water separated by and accumulated in the gas-liquid separator 24 is provided in the gas-liquid separator 24. The water level sensor 28 detects upper limit and lower limit water levels in the gas-liquid separator 24. Then, a control device 40, to described below, outputs a signal of an operation command to the water discharge valve 26 based on the detected water level. When the water level sensor 28 detects that the water level is at the upper limit, the water discharge valve 26 is opened by the control device 40 and the water separated and accumulated in the gas-liquid separator 24 is released to the outside via the release conduit 38. When the water-level sensor 28 detects that the water level is at the lower limit, the water discharge valve 26 is closed by the control device 40, and water is again accumulated in the gas-liquid separator 24.

The circulation device 30 incorporates a pump (not shown in the drawing), and the discharged fuel gas discharged from the fuel cell 12 is delivered to the fuel gas supply conduit 16 by the operation of the pump. With this configuration, the discharged fuel gas and the fuel gas provided by the fuel gas tank 14 flow together at the interflow section 20 of the fuel gas supply conduit 16, before being supplied to the fuel cell 12.

On end of the air supply conduit 22 is open to the outside. An air pump (not shown in the drawing) is provided in the air supply conduit 22, and air is supplied from the outside to the fuel cell 12 by the operation of the air pump.

The fuel cell system 10 comprises a control device 40 which controls the water discharge valve 26 based on various input signals. The various input signals include the temperature of the fuel gas input from the temperature sensor 32 and the water level input from the water level sensor 28. The control device 40 stores a table corresponded to the temperature of the fuel gas and a ratio of an opening time (herein after, referred to as opening time ratio) of the water discharge valve 26 in a predetermined time. The water discharge valve 26 repeats ON/OFF within the predetermined time, and the flow volume of the discharged fuel gas to be released from the water discharge valve 26 to the outside is controlled by controlling the ratio of the ON state within the predetermined time. That is, when the opening time ratio is large, the amount of the discharged fuel gas to be released from the water discharge valve 26 to the outside is increased, and when the opening time ratio is small, the amount of the discharged fuel gas to be released is reduced, and the amount of the fuel gas to be returned to the fuel gas supply conduit 16 and re-circulated is increased.

The control device 40 determines whether or not freezing occurs in the fuel gas supply conduit 16 based on the detection temperature detected by the temperature sensor 32. Although the temperature at which water freezes is 0° C., in the present embodiment, a temperature slightly higher than 0° C., for example, 2° C., is used as the basis of the determination in consideration of possible detection errors and of the control operation time.

When the detection temperature detected by the temperature sensor 32 is greater than 2° C., the control device 40 determines that no freezing can occur, and effects control to cause the water discharge valve 26 to open if at the upper limit water level or close if at the lower limit water level, so that the above-described operation of the water discharge valve 26 is performed in a normal manner.

When, on the other hand, the detection temperature detected by the temperature sensor 32 is less than or equal to 2° C., the control device 40 determines that freezing can occur and controls the operation of the water discharge valve 26 to release at least a part of the discharged fuel gas to the outside based on the detection temperature. The control device 40 selects the opening time ratio corresponding to the detection temperature detected by the temperature sensor 32 from the pre-installed table, and then outputs a signal communicating the operation command so that the water discharge valve 26 will implement the selected opening time ratio. The water discharge valve 26 is operated by the output signal, and water accumulated in the gas-liquid separator 24 is first released to the outside via the release conduit 38. Subsequently, the discharged fuel gas is released to the outside. As described above, when it is determined that the freezing occurs, the control device 40 adjusts the degree of opening of the water discharge valve 26 based on the selected opening time ratio, and, accordingly, at least apart of the discharged fuel gas which flows in the circulation conduit 18 is released to the outside, and the amount of the discharged fuel gas returned to the fuel gas supply conduit 16 is reduced.

Figure 2:
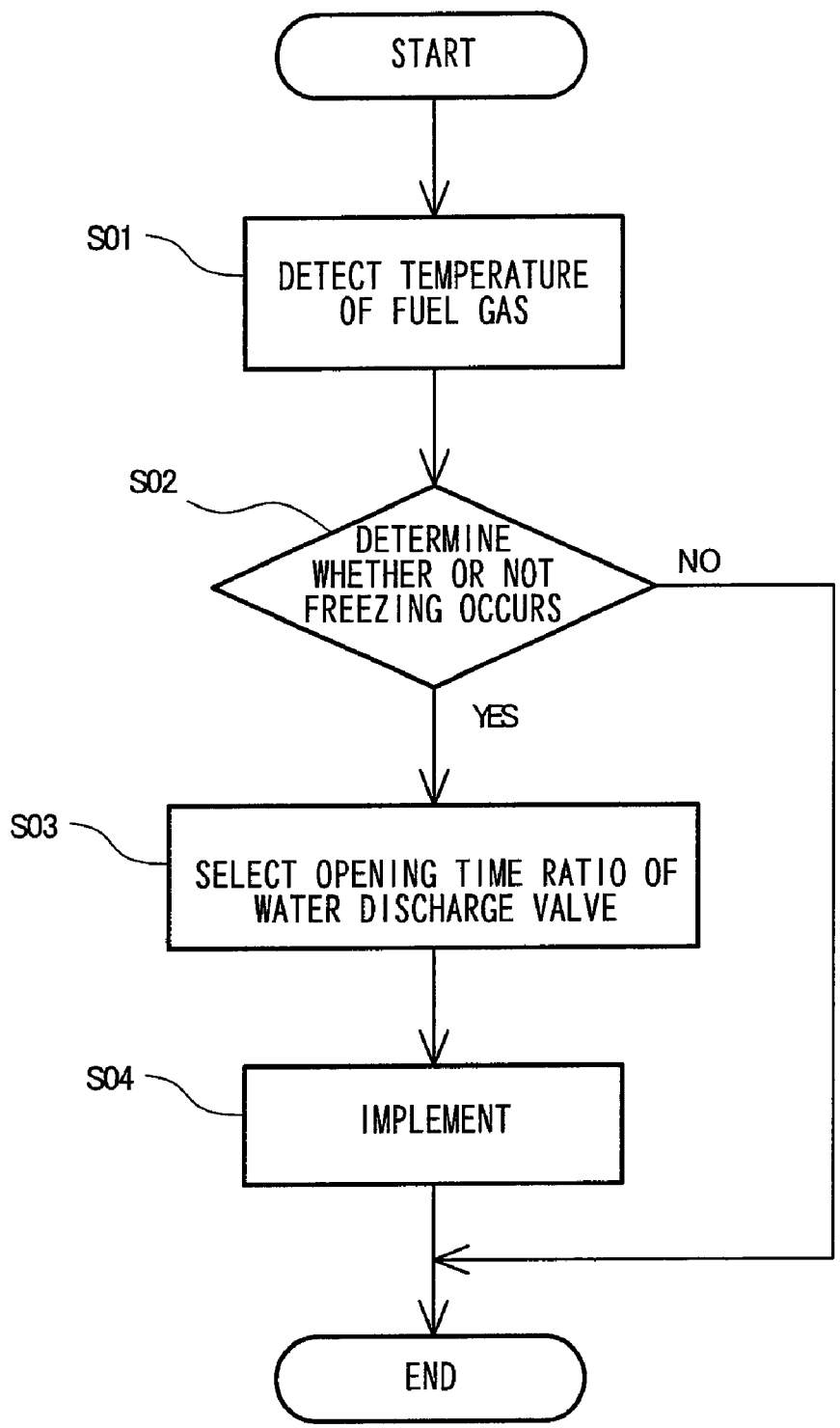
FIG. 2 is a flowchart showing a control operation example of freezing prevention of a control device according to the embodiment of the present invention.

Next, an example control operation of the control device 40 which prevents from freezing in the fuel gas supply conduit 16 will be described with reference to the drawings. FIG. 2 is a flow chart showing an example of a control operation performed by the control device 40 according to the present embodiment in order to prevent freezing.

First, at step S01, the temperature of the fuel gas detected by the temperature sensor 32 is input to the control device 40.

At step S02, it is determined whether or not freezing can occur in the fuel gas supply conduit 16 based on the input temperature of the fuel gas. When the temperature of the fuel gas is, for example, more than 2° C., it is determined that freezing will not occur in the fuel gas supply conduit 16, and the control operation is ended. On the other hand, when the temperature of the fuel gas is, for example, 2° C. or less, it is determined that freezing may occur in the fuel gas supply conduit 16, and the operation of step S03 is implemented.

At step S03, the opening time ratio is selected from the table based on the input temperature of the fuel gas. In a case wherein the temperature of the fuel gas is, for example, near 2° C., a small opening time ratio is selected, and, as the temperature of the fuel gas falls further below 2° C., a larger opening time ratio is selected. That is, as the temperature of the fuel gas decreases below 2° C., the operation of the water discharge valve 26, which seems to release more discharged fuel gas to the outside, is selected. Eventually, when the temperature of the fuel gas falls below, for example, −2° C., the largest opening time ratio is selected. That is, operation of the water discharge valve 26 to release all the discharged fuel gas to the outside, that is, fully open is selected.

At step S04, operation is implemented so that the water discharge valve 26 becomes the state selected in step S03, and the control operation is ended.

With the fuel cell system 10 of the present embodiment, when the temperature of the environment inside the fuel gas supply conduit 16 is at a temperature where freezing is likely to occur, the control device 40 causes the water discharge valve 26 operate and at least a portion of the discharged fuel gas is released to the outside, such that the flow volume of the discharged fuel gas returned to the fuel gas supply conduit 16 can be reduced. Because the flow volume of the discharged fuel gas returned to the fuel gas supply conduit 16 is reduced, the amount of moisture (water vapor) in the gas is reduced, thereby reducing one factor which contributes towards freezing.

Furthermore, should the temperature in the fuel gas supply conduit 16 be further reduced, a greater amount of discharged fuel gas is released to the outside, thereby further reducing the amount of moisture (water vapor) returned to the fuel gas supply conduit 16, and in turn further reducing the effects of this contributing factor towards freezing. Even when a small amount of the water vapor passing through the conduit on its way to the fuel gas supply conduit 16 is frozen, the resulting ice crystals are heated with warm air in the fuel cell 12, and unfrozen. Consequently, ice forming on a surface of the fuel gas supply conduit 16 due to accumulated ice crystals can be prevented. Further, even if a small amount of ice does adhere the wall surface of the fuel gas supply conduit 16, after a certain period of time the ice will melt as the fuel gas supply conduit 16 is warmed by warm air operation of the fuel cell system 10.

However, when the temperature in the fuel gas supply conduit 16 is still further reduced, all the discharged fuel gas is released to the outside, such that all of the moisture content is eliminated, and none is returned to the fuel gas supply conduit 16. Because there is no moisture, freezing of water in the conduit can be reliably prevented, even when the environment inside of the fuel gas supply conduit 16 is in at a temperature where water would very likely be frozen.

As described above, by employing the fuel cell system 10 of the present embodiment, freezing can be prevented using a simple structure without significant reconfiguration or considerable new components. Furthermore, even when the environment inside the fuel gas supply conduit 16 is at a temperature where it is likely to be frozen, the discharged fuel gas is still returned to the fuel gas supply conduit 16 and delivered to the fuel cell 12, and, therefore, the efficiency of the fuel cell system 10 can be enhanced.

Figure 3:
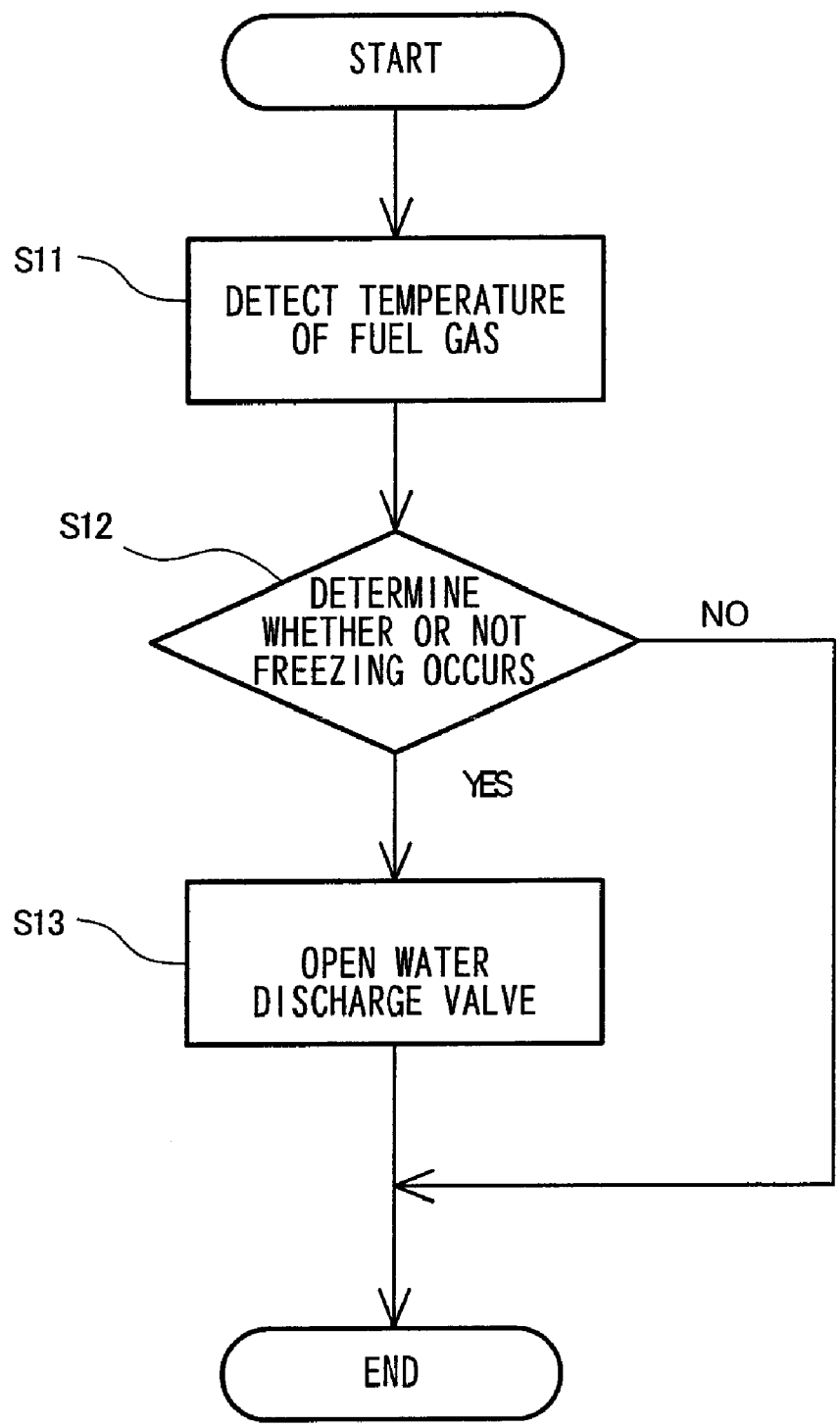
FIG. 3 is a flowchart showing another control operation example of freezing prevention of the control device according to the embodiment of the present invention.

Next, another example control operation of the control device 40 will be described, in which reliable prevention of freezing is emphasized enhancement of electric generation efficiency of the fuel cell system 10. FIG. 3 is a flowchart showing a different control operation example of freezing prevention of the control device 40 according to the present example.

First, at step S11, the temperature of the fuel gas detected by the temperature sensor 32 is input to the control device 40.

At step S12, it is determined whether or not it is possible that freezing may occur in the fuel gas supply conduit 16 based on the input temperature of the fuel gas. When the temperature of the fuel gas is, for example, greater than 2° C., it is determined that freezing will not occur in the fuel gas supply conduit 16, and the control operation is ended. On the other hand, when the temperature of the fuel gas is, for example, 2° C. or less, it is determined that freezing may occur in the fuel gas supply conduit 16, and the operation of step S13 is implemented.

In step S13, an operation is implemented to cause the water discharge valve 26 to open, and the control operation is ended.

According to the fuel cell system 10 of the present example, when the environment inside the fuel gas supply conduit 16 is at a temperature where water is likely to freeze, the control device 40 causes the water discharge valve 26 operate and all the discharged fuel gas is released to the outside, and, therefore, the volume of the discharged fuel gas returned to the fuel gas supply conduit 16 is completely eliminated. Because the flow volume of the discharged fuel gas returned to the fuel gas supply conduit 16 is reduced to zero, all moisture contained in the gas is eliminated along with the discharge fuel gas, and freezing can be reliably prevented. As described above, according to the fuel cell system 10 of the present embodiment, freezing can be prevented using a simple structure without adding a considerable new configuration.

In the examples of above embodiment, the water discharge valve 26 is given as an example of a unit which releases the discharged fuel gas to the outside; however, the present invention is not limited to such a configuration. For example, a release valve which is provided in the circulation conduit 18 and releases the discharged fuel gas when the concentration of nitrogen in the circulation conduit 18 becomes high may be used, as long as the discharged fuel gas in the circulation conduit 18 can be released to the outside.

Further, although in the above examples it is described that the presence or absence of the freezing in the fuel gas supply conduit 16 is determined based on the temperature detected by the temperature sensor 32, the present invention is not limited to such configuration. For example, the temperature of the interflow section 20 where freezing is likely can be calculated based on another detected value, determination may be made based on a calculated result. For example, one or more of the temperature in the fuel cell 12, the outside temperature of the fuel cell system 10, the flow volume of the fuel gas flown out from the fuel gas tank 14, and the flow volume of the discharged fuel gas to be returned to the fuel gas supply conduit 16 may be detected, and the determination may be made based on the temperature of the interflow section 20 as calculated from the detected value or values.

Further, although in the above examples it is described that the control device 40 selects the opening time ratio to control the flow volume of the discharged fuel gas to be returned to the fuel gas supply conduit 16, the present invention is not limited to such a configuration. For example, a water discharge valve may be configured to continuously adjust the degree of opening, and the degree of opening of the water discharge valve may be determined in order to adjust the flow volume of the discharged fuel gas released to the outside, and to thereby control the flow volume of the discharged fuel gas e returned to the fuel gas supply conduit 16.

The invention claimed is:

1. A fuel cell system comprising:
   a supply conduit which supplies fuel gas from a fuel gas source to a fuel cell;
   a circulation conduit which returns discharged fuel gas discharged from the fuel cell to the supply conduit, and circulates the discharged fuel gas to the fuel cell;
   a release unit which is provided in the circulation conduit, and releases the discharged fuel gas to the outside of the fuel cell system;
   a temperature detection unit which detects the temperature of the fuel gas which flows in the supply conduit; and
   a determining unit which determines whether or not freezing conditions are present in the supply conduit based on a detection temperature detected by the temperature detection unit while the fuel cell is in operation; and
   a flow volume control unit which releases at least a portion of the discharged fuel gas from the release unit to the outside of the fuel cell system, and controls the flow volume of the discharged fuel gas to be returned to the supply conduit, when the determining unit determines that freezing conditions are present,
   wherein, when the determining unit determines that freezing conditions are present, and when the detection temperature is less than or equal to a predetermined value, a volume of discharged fuel gas is returned to the supply conduit, wherein the flow volume control unit is programmed to control the flow volume of the discharged fuel gas to be returned to the supply conduit to be lower than when the detection temperature is greater than the predetermined value.

2. A fuel cell system comprising:
   a supply conduit which supplies fuel gas from a fuel gas source to a fuel cell;
   a circulation conduit which returns discharged fuel gas discharged from the fuel cell to the supply conduit, and circulates the discharged fuel gas to the fuel cell;
   a release unit which is provided in the circulation conduit, and releases the discharged fuel gas to the outside of the fuel cell system;
   a temperature detection unit which detects the temperature of the fuel gas which flows in the supply conduit;
   a flow volume control unit which releases at least a portion of the discharged fuel gas from the release unit to the outside of the fuel cell system, and controls the flow volume of the discharged fuel gas to be returned to the supply conduit, when the detection temperature detected by the temperature detection unit is a low temperature while the fuel cell is in operation; and
   a gas-liquid separator which is provided in the circulation conduit, and separates moisture contained in the discharged fuel gas,
   wherein the release unit is a water discharge valve which drains the moisture separated by the gas-liquid separator, and
   in the case where the detection temperature is low and the detection temperature is less than or equal to a predetermined value, a volume of discharged fuel gas is returned to the supply conduit, and the flow volume control unit is programmed to adjust the degree of opening of the water discharge valve and is programmed to control the flow volume of the discharged fuel gas to be returned to the supply conduit to be lower than when the detection temperature is greater than the predetermined value.

3. The fuel cell system according to claim 1,
   further comprising a gas-liquid separator which is provided in the circulation conduit and separates moisture contained in the discharged fuel gas, and
   wherein the release unit is a water discharge valve which drains the moisture separated by the gas-liquid separator, and
   the flow volume control unit is programmed to adjust the degree of opening of the water discharge valve and is programmed to control the flow volume of the discharged fuel gas.

4. The fuel cell system according to claim 1,
   wherein the temperature detection unit detects the temperature of an interflow portion in the supply conduit where the discharged fuel gas and the fuel gas flow together.

5. The fuel cell system according to claim 2,
   wherein the temperature detection unit detects the temperature of an interflow portion in the supply conduit where the discharged fuel gas and the fuel gas flow together.

* * * * *